United States Patent
Mu

(10) Patent No.: US 10,614,598 B2
(45) Date of Patent: *Apr. 7, 2020

(54) SYSTEMS AND METHODS FOR GENERATING 2D PROJECTION FROM PREVIOUSLY GENERATED 3D DATASET

(71) Applicant: Zhiping Mu, Foster City, CA (US)

(72) Inventor: Zhiping Mu, Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/122,935

(22) Filed: Sep. 6, 2018

(65) Prior Publication Data
US 2019/0005685 A1    Jan. 3, 2019

Related U.S. Application Data

(63) Continuation of application No. 15/199,015, filed on Jun. 30, 2016, now Pat. No. 10,089,756.

(51) Int. Cl.
*G06T 11/00* (2006.01)
*G06T 15/08* (2011.01)

(52) U.S. Cl.
CPC .......... *G06T 11/003* (2013.01); *G06T 11/008* (2013.01); *G06T 15/08* (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 2008/0180580 A1* | 7/2008 | Kadrmas | G06T 11/003 348/744 |
| 2009/0005668 A1 | 1/2009 | West et al. | |
| 2010/0245684 A1* | 9/2010 | Xiao | H04N 9/3147 348/745 |
| 2011/0122226 A1* | 5/2011 | Kamen | G06T 7/35 348/43 |
| 2011/0313285 A1 | 12/2011 | Fallavollita et al. | |
| 2012/0008734 A1* | 1/2012 | Thomson | G06T 7/0014 378/4 |
| 2014/0334709 A1 | 11/2014 | Siewerdsen et al. | |
| 2014/0355844 A1* | 12/2014 | Menini | G06T 11/006 382/121 |
| 2016/0335496 A1* | 11/2016 | Hinterstoisser | G06K 9/00664 |
| 2018/0005411 A1 | 1/2018 | Mu | |

OTHER PUBLICATIONS

A.V. D'Amico, C.M. Tempany, R. Cormack, N. Hata, M. Jinzaki, K. Tuncali, M. Weinstein, and J.P. Richie "Transperineal Magnetic Resonance image guided prostate biopsy,": The Journal of Urology, vol. 164, No. 2 (2000); 385-387.

(Continued)

*Primary Examiner* — Delomia L Gilliard
(74) *Attorney, Agent, or Firm* — Haynes and Boone, LLP

(57) ABSTRACT

A method includes providing a set of 2D images of an object, wherein the set of 2D images is obtained from a three-dimensional (3D) image of the object placed at a first pose. The method further includes projecting the set of 2D images from the first pose to a second pose different from the first pose, thereby obtaining a set of re-projected 2D images; and combining the set of re-projected 2D images into a single 2D image.

20 Claims, 11 Drawing Sheets

(56) References Cited

OTHER PUBLICATIONS

R.M. Pijnappel, M. Van Den Donk, R. Holland, WP TH M. Mali, J.L. Peterse, J.H.C.L. Hendriks, and P.H.M. Peeters, "Diagnostic accuracy for different strategies of image-guided breast intervention in cases of nonpalpable breast lesions," British Journal of Cancer, vol. 90, No. 3 (2004); 595-600.

W. Grimson, L., J.Gil, S.J. Ettinger, T. Lozano-Perez, W.M. Wells, R. Kikinis, "An automatic registration method for frameless sterotaxy, image guided surgery, and enhanced reality visualization," Medical Imaging, IEEE Transactions on 15, No. 2 (1996); 129-140.

X. Papademetris, et al., "Development of a research interface for image guided intervention; Initial application to epilepsy neurosurgery," In Biomedical Imaging: Nano to Macro, 2006, $3^{rd}$ IEEE International symposium on, pp. 490-493 IEEE, 2006.

D.J. Moseley, E.A. White, KL Wilshire, T Rosewall, MB Sharpe, JH Siewerdsen, JP Bissonnette, M. Gospodarowiez, P. Warde, CN Catton, and DA Jaffray, "Comparison of localization performance with implante fiducial markers and cone-beam computed tomography for on-line image-guided radiotherapy of the prostate," International Journal of Radiation Oncology Biology Physics, 67(3), pp. 942-953, 2007.

J.Y. Jin, S. Ryu, K. Faber, T. Mikkelsen, Q. Chen, S. Li and B. Movsas, "2D/3D image fusion for accurate target localization and evaluation of a mask based stereotactic system in fractionated stereotactic radiotherapy of cranial lesions", Medical Physics, vol. 33, No. 12, pp. 4557-4566, 2006.

D.B. Russakoff, T. Rohlfing, D. Rueckert, R. Shahidi, D. Kim and C.R. Maurer, "Fast calculation of digitally reconstructed radiographs using light fields", SPIE, pp. 684-695.

P. Lacroute and M. Levoy, "Fast volume rendering using a shear-warp factorization of the viewing transformation", ACM, pp. 451-458.

W. Birkfellner, R. Seemann, M. Figl, J. Hummel, C. Ede, P. Homolka, H. Bergmann, J. Duncan and G. Gerig, "Fast DRR generation for 2D/3D registration" in MICCAI2005, LNCS, vol. 3750, pp. 960-967, 2005, Springer Berlin Heidelberg.

W. Birkfellner, R. Seemann, M. Figl, J. Hummel, C. Ede, P. Homolka and H. Bergmann, "Wobbled splatting—A fast perspective volume rendering method for simulation of x-ray images from CT", Phys. Med. Biol., vol. 50, No. 9, pp. N73-N84, 2005.

D.B. Russakoff, T. Rohlfing, K. Mori, D. Rueckert, A. Ho, J.R. Adler Jr. and C.R. Maurer Jr. "Fast generation of digitally reconstructed radiographs using attenuation fields with application to 2D-3D image registration," Medical Imaging, IEEE Transactions on, vol. 24, No. 11, pp. 1441-1454, 2005.

T. Rohlfing, D.B. Russakoff, J. Denzler, K. Mori and C.R. Maurer, "Progressive attenuation fields: fast 2D-3D image registration without precomputation", Medical Physics, vol. 32, No. 9, pp. 2870-2880, 2005.

Z. Mu, "A Novel Fast DRR Generation Method by Reassembling Previously Generated Projection Blocks," 2016 IEEE Intl. Conf Biomed Health Informatics, Las Vegas, 2016.

G.J. Tornai, G. Cserey, I. Pappas, Fast DRR generations for 2D to 3D Registration on GPU's, Medical Physics, vol. 39, No. 8, pp. 4795-4799, 2012.

O.M. Dorgham, S.D. Laycock and M.H. Fisher, "GPU accelerated generation of digitally reconstructed radiographs for 2-D/3-D image registration", IEEE Trans. Biomedical Engineering, vol. 59, No. 9, pp. 2594-2603, 2012.

K. Mueller, T. Moller, J.E. Swan, R. Crawfis, N. Shareef and R. Yagel, "Splatting errors and antialiasing", IEEE Trans. Vis. Comput. Graph., vol. 4, No. 2, pp. 178-191, 1998.

D.B. Russakoff et al., "Fast Intensity-based 2-D-3D Image Registration of Clinical Data Using Light Fields," IEEE International Conference of Computer Vision (ICCV'03), 2003, 7695-1950 (7 pages).

T. Heimann et al., "Statistical Shape Models for 3D Medical Image Segmentation: A Review," Medical Image Analysis 13 (2009) Elsevier B.V. pp. 543-563.

B. Zitova et al., "Image Registration Methods: A Survey," Image and Vision Computing 21 (2003) Elsevier B.V., 977-1000.

International Searching Authority—U.S. Patent & Trademark Office, PCT Notification of Transmittal of the International Search Report and the Written Opinion of the International Searching Authority, or the Declaration dated Sep. 18, 2017, for PCT Application No. PCT/US2017/039704, 10, Alexandria, Virginia.

\* cited by examiner

| 3D image of an object | Z | | | | |
|---|---|---|---|---|---|
| Volumes | V | | | W | |
| Sub-volumes | V1 | V2 | V3 | W1 | W2 |
| Pose 1 Projections | V11 | V21 | V31 | W11 | W21 |
| Pose 2 Projections | V12 | V22 | V32 | W12 | W22 |
| Pose 3 Projections | V13 | V23 | V33 | W13 | W23 |
| New Pose x (NP1) Projections | (V11+V21)x | | V3x | - | |
| New Pose y (NP2) Projections | - | | | (W13+W23)y | |
| 2D image at New Poses x and y, individually | G1 = (V11 + V21)x + V3x | | | G2 = (W13+W23)y | |
| 2D image at New Poses x and y, collectively | G = (V11+ V21)x + V3x + (W13 + W23)y | | | | |

Fig. 9

SYSTEMS AND METHODS FOR GENERATING 2D PROJECTION FROM PREVIOUSLY GENERATED 3D DATASET

PRIORITY

This is a continuation of U.S. patent application Ser. No. 15/199,015, filed Jun. 30, 2016, entitled "Systems and Methods for Generating 2D Projection from Previously Generated 3D Dataset," the entire disclosure of which is herein incorporated by reference.

TECHNICAL FIELD

The present disclosure generally relates to systems and methods for generating two-dimensional (2D) projections (or images) from a previously generated three-dimensional (3D) dataset. More particularly, the present disclosure relates to methods for quickly creating synthetic 2D images, such as digitally reconstructed radiograph (DRR), from a 3D image sometimes represented as a 3D dataset.

BACKGROUND

Computing 2D projections (or images) from a 3D dataset has found increased use in many applications, such as image guidance and image rendering. However, conventional methods usually bear a high computational complexity. New and improved methods for quickly computing 2D images from a 3D dataset are needed.

For example, image guidance is a daily practice in clinical institutions around the world. It provides unprecedented positioning accuracy and improved quality of treatment, vital to many clinical procedures such as biopsy, surgery, interventional procedures, and radiation treatments. For example, in image-guided radiotherapy (IGRT), a pre-operative image is usually a 3D computed tomography (CT) image used for treatment planning. At treatment time, intra-operative images are acquired and compared with the pre-operative image to determine alignment errors. Compared with 3D modalities such as Cone Beam CT, 2D X-ray imaging is often chosen for intra-operative imaging due to its fast acquisition and low imaging dose, and 3D-2D image registration is usually employed to register the 3D pre-operative CT image with 2D X-ray intra-operative images acquired with patient on the treatment couch.

Since 3D and 2D images cannot be directly registered, the 2D X-ray intra-operative images are usually registered with synthetic images called DRRs. DRRs are simulated X-ray-like images created from a 3D CT image by placing the 3D volume (represented by that CT image) in specific poses within a virtual imaging system that simulates the actual X-ray imaging geometry.

Conventional registration methods usually operate iteratively: start with a hypothetical pose, create DRRs for that pose, evaluate similarity with intra-operative images, and search for the next potential pose; then generate DRRs for this new pose, and the iteration goes on. During the search, DRRs may be generated for multiple poses close to the current pose for numerical estimation of derivatives. For example, if the method employs a six-dimensional (6D) search (i.e., 3D translation and 3D rotation), additional DRRs will be generated for six close poses just for a gradient estimation at one pose. Typically DRRs will be generated for hundreds of times during registration.

DRR generation is computationally intensive in nature, and conventional methods usually bear a high complexity level. Given its complexity and frequency of execution during registration, faster DRR generation methods are highly desired.

SUMMARY

The present disclosure relates to systems and methods for quickly creating synthetic 2D images, such as digitally reconstructed radiographs (DRRs), from a given 3D image that is represented as a 3D dataset.

A system according to an embodiment of the present disclosure includes a first non-transitory memory and one or more first hardware processors coupled to the first non-transitory memory. The one or more first hardware processors are configured to execute instructions to perform first operations. The first operations include receiving a first set of 2D images of an object. The first set of 2D images is derived from a 3D image of the object placed at a first pose, and spans a whole volume of the 3D image. Further, each element of any 2D image in the first set is a line-integral of multiple elements of the 3D image overlapping along a ray (or an imaginary projection line). Still further, at least one of the 2D images corresponds to a sub-volume of the 3D image that is smaller than the total volume of the 3D image, but at one spatial point spans at least two times of the minimum dimensional unit along each of three axes that define the 3D image. The first operations further include projecting the first set of 2D images from the first pose to a second pose different from the first pose, thereby obtaining a second set of 2D images; and combining the second set of 2D images, thereby obtaining a 2D image of the object placed at the second pose.

Another system according to an embodiment of the present disclosure includes a first non-transitory memory and one or more first hardware processors coupled to the first non-transitory memory. The one or more first hardware processors are configured to execute instructions to perform first operations. The first operations include receiving a first set of 2D images of an object, binding multiple 2D images of the first set into a bound 2D image. The first set of 2D images is derived from a three-dimensional (3D) image of the object placed at a first pose, and the multiple 2D images correspond to adjacent sub-volumes of the 3D image. The first operations may optionally deform (or vary) some of the first set of 2D images. The first operations further include projecting the first set of 2D images including the bound 2D image from the first pose to a second pose different from the first pose, thereby obtaining re-projected 2D images. The first operations further include combining the re-projected 2D images, which may be a linearly weighted sum of the re-projected 2D images, a non-linearly weighted sum of the re-projected 2D images, or other suitable combinations of the re-projected 2D images. Before the combining of the re-projected 2D images, the first operations may optionally deform (or vary) one of the re-projected 2D images.

Yet another system according to an embodiment of the present disclosure includes a second non-transitory memory and one or more second hardware processors coupled to the second non-transitory memory. The one or more second hardware processors are configured to execute instructions to perform second operations. The second operations include partitioning a 3D image of an object into a set of sub-volumes; and obtaining one or more sets of 2D images by generating, for each of one or more poses, a set of 2D images from the set of sub-volumes. The second operations further include storing the one or more sets of 2D images in a third non-transitory memory.

A method according to an embodiment of the present disclosure includes partitioning a three-dimensional (3D) image of an object into a set of sub-volumes, and projecting the set of sub-volumes into an image surface with the object being at each of one or more poses, which generates one or more sets of two-dimensional (2D) images with each set of the 2D images corresponding to one of the one or more poses. The method further includes storing the one or more sets of 2D images in a non-transitory memory. In a further embodiment, the method includes selecting a first set of 2D images from the one or more sets of 2D images, wherein the first set of 2D images corresponds to a first pose of the one or more poses; projecting the first set of 2D images from the first pose to a second pose, thereby obtaining a second set of 2D images; and combining the second set of 2D images, thereby obtaining a 2D image of the object at the second pose. In yet another embodiment, before the projecting of the first set of 2D images, the method includes binding multiple 2D images of the first set into a bound 2D image. The multiple 2D images correspond to adjacent sub-volumes of the 3D image, and the projecting of the first set of 2D images includes projecting the bound 2D image.

Another method according to an embodiment of the present disclosure includes receiving a first set of 2D images of an object, wherein the first set of 2D images are derived from a three-dimensional (3D) image of the object placed at a first pose. The method further includes binding first multiple 2D images of the first set into a first bound 2D image and second multiple 2D images of the first set into a second bound 2D image, wherein the first and second multiple 2D images correspond to first and second adjacent sub-volumes of the 3D image respectively. The method further includes projecting the first and second bound 2D images from the first pose to a second pose different from the first pose, thereby obtaining first and second projected bound 2D images. The method further includes combining the first and second projected bound 2D images.

Yet another method according to an embodiment of the present disclosure includes deriving first and second volumes from a three-dimensional (3D) image of an object, wherein each of the first and second volumes is also a respective 3D image. The method further includes partitioning the first volume into first sub-volumes and partitioning the second volume into second sub-volumes. The method further includes projecting the first sub-volumes into an image surface with the object being at each of one or more poses, thereby generating one or more sets of first two-dimensional (2D) images. Each set of the first 2D images corresponds to one of the one or more poses. The method further includes projecting the second sub-volumes into the image surface with the object being at each of the one or more poses, thereby generating one or more sets of second 2D images. Each set of the second 2D images corresponds to one of the one or more poses. The method may perform the projecting of the first and second sub-volumes simultaneously. The method further includes storing the one more sets of first 2D images and the one or more sets of second 2D images in a non-transitory memory. In a further embodiment, the method includes selecting a first set of first 2D images from the one or more sets of first 2D images, the first set of first 2D images corresponding to a first pose of the one or more poses; and selecting a first set of second 2D images from the one or more sets of second 2D images, the first set of second 2D images corresponding to a third pose of the one or more poses. The method further includes projecting the first set of first 2D images from the first pose to a second pose, thereby obtaining a second set of first 2D images; and projecting the first set of second 2D images from the third pose to the second pose, thereby obtaining a second set of second 2D images. The method further includes combining the second set of first 2D images and the second set of second 2D images, thereby obtaining a 2D image of the object at the second pose. In yet another further embodiment, the method includes binding multiple first 2D images of the first set of first 2D images into a bound first 2D image before the projecting of the first set of first 2D images, and/or binding multiple second 2D images of the first set of second 2D images into a bound second 2D image before the projecting of the first set of second 2D images. The multiple first 2D images correspond to adjacent first sub-volumes, and the multiple second 2D images correspond to adjacent second sub-volumes.

The provided subject matter may be used in image-guided radiotherapy (IGRT) and image rendering as non-limiting application examples.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one having ordinary skill in the art from the following detailed description.

BRIEF DESCRIPTION OF THE DRAWINGS

The accompanying drawings illustrate embodiments of the systems and methods disclosed herein and together with the description, serve to explain the principles of the present disclosure.

FIG. 9 illustrates some results of certain steps performed by the method in FIG. 8, in accordance with an embodiment.

DETAILED DESCRIPTION

Figure 1:
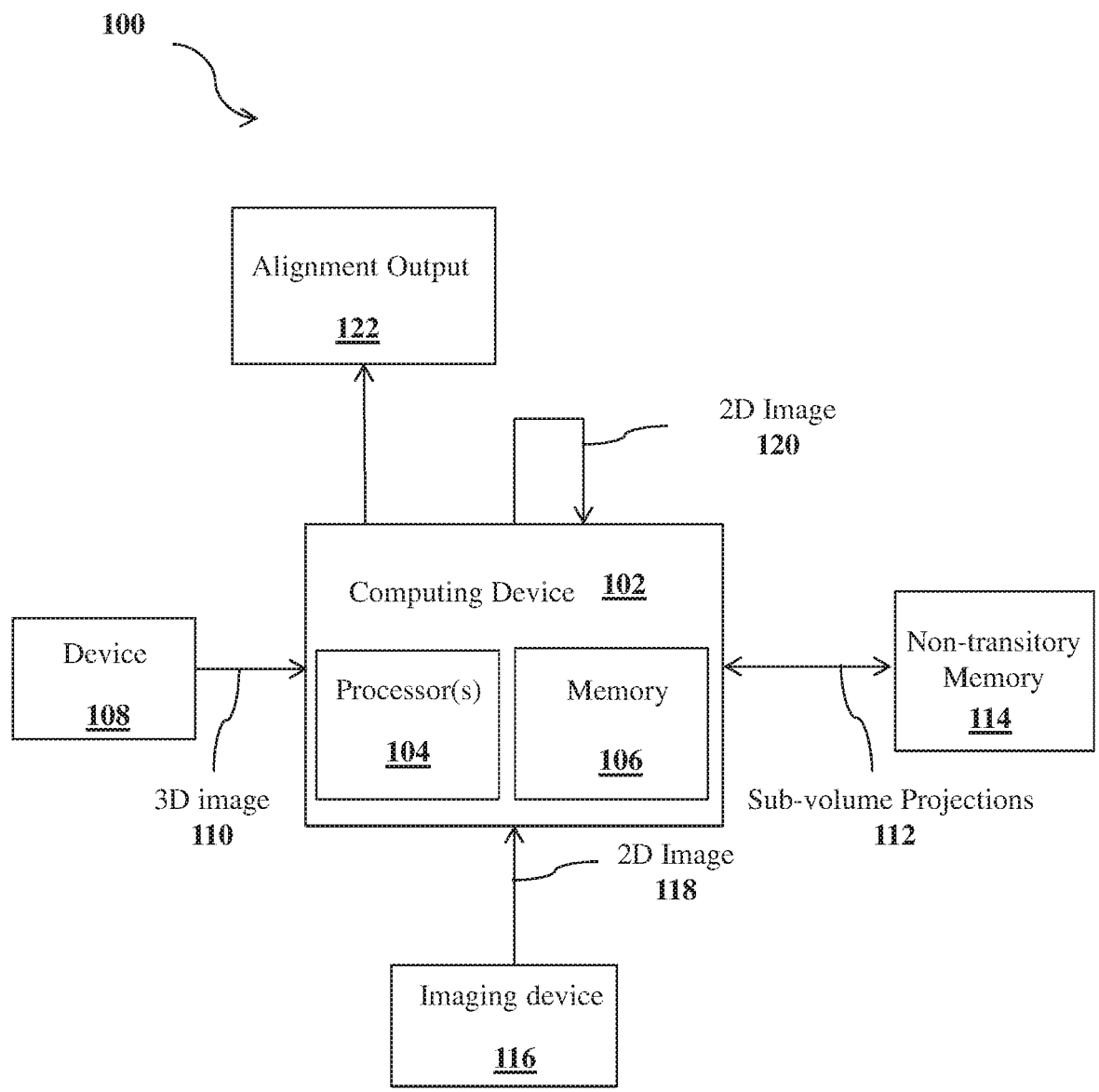
FIG. 1 is a schematic view of an image guidance system, constructed according to aspects of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one having ordinary skill in the art to which the disclosure relates. For example, the features, components, and/or steps described with respect to one embodiment may be combined with the features, components, and/or steps described with respect to other embodiments of the present disclosure to form yet another embodiment of a device, system, or method according to the present disclosure even though such a combination is not explicitly shown. Further, for the sake of simplicity, in some instances the same reference numerals are used throughout the drawings to refer to the same or like parts.

FIG. 1 is a schematic view of an embodiment of a system 100, constructed according to aspects of the present disclosure. In a particular embodiment, the system 100 may be used in image guidance. Therefore it is also referred to as an image guidance system 100. Referring to FIG. 1, the system 100 includes a computing device 102 that may be, for example, a personal computer (PC), a workstation, a mobile computing device such as a tablet, or other computing devices. The computing device 102 includes a processor 104 and a memory 106. The computing device 102 performs specific operations by the processor 104 and other components (not shown) by executing one or more sequences of instructions contained in the memory 106. Instructions may also be referred to as code. The terms "instructions" and "code" should be interpreted broadly to include any type of computer-readable statement(s). For example, the terms "instructions" and "code" may refer to one or more software applications, programs, routines, sub-routines, functions, procedures, etc. "Instructions" and "code" may include a single computer-readable statement or many computer-readable statements.

The processor 104 represents one or more general-purpose processing devices such as a microprocessor, central processing unit (CPU), graphics processing unit (GPU), or the like. More particularly, the processor 104 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 104 may also be one or more special-purpose processing devices such as an application specific integrated circuit (ASIC), a field programmable gate array (FPGA), a digital signal processor (DSP), network processor, or the like. The processor 104 is configured to execute instructions for performing the operations and steps discussed herein.

In an embodiment, the memory 106 is a non-transitory computer-readable storage media which comprises all computer-readable storage media except for a transitory, propagating signal. Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read. For example, the memory 106 may be a floppy disk, a magnetic hard disk drive (HDD), a solid-state drive (SSD), or an optical memory (e.g., CD-ROM, DVD, and Blu-Ray Disc).

The computing device 102 may employ any computing architecture, such as centralized computing, distributed computing, clustered computing, cloud computing, and client server computing.

Still referring to FIG. 1, the computing device 102 interfaces with a device 108 for accessing a 3D image 110. In an embodiment, the 3D image 110 is represented in the form of digital dataset. For example, the 3D image 110 may be a 3D computed tomography (CT) image (such as a helical CT, a cone beam CT(CBCT), etc.), a 3D tomosynthesis image, a 3D positron emission tomography (PET), a single photon emission computed tomography (SPECT), a ultrasound transmission tomography (UTT), or a 3D magnetic resonance imaging (MRI) image. In embodiments, the device 108 can be one or multiple devices such as an imaging device, a picture archiving and communication system (PACS), or a treatment planning system (TPS).

The computing device 102 also interfaces with a non-transitory memory 114 for reading from and writing to (including updating) sub-volume projections 112 stored on the non-transitory memory 114. In embodiments, the non-transitory memory 114 may be a floppy disk, a magnetic hard disk drive (HDD), a solid-state drive (SSD), an optical memory (e.g., CD-ROM, DVD, and Blu-Ray Disc), or any other non-transitory memory discussed above with reference to the memory 106.

The computing device 102 also interfaces with an imaging device 116 for receiving a 2D image 118 that is taken (or produced) by the imaging device 116. In an example, the 2D image 118 can be an X-ray image or a gamma ray image taken off a patient on a treatment couch. In various embodiments, the device 116 can be a gamma camera, digital radiography (DR) system, a computed radiography (CR) system, or a combination of a traditional film-based X-ray system and a film digitizer.

As illustrated in FIG. 1, the computing device 102 generates one or more 2D images (or projections) 120 and performs image registration with the 2D image 118. It also calculates an alignment offset between a planned patient position (a first pose) and the current patient position (a second pose). The alignment offset is sent to an alignment output 122 module for further processing. For example, the alignment offset may be sent to the treatment couch to adjust the patient position. For another example, a doctor may use the alignment offset to adjust positions of operation tools.

The interfaces between the computing device 102 and the other components of the system 100 may be a local transport media or may include one or more network devices. In some examples, network devices include routers, hubs, switches, and so forth. In some examples, transport media include Ethernet cable, Fibre Channel Cable, wireless signals, Universal Serial Bus (USB) cable, and so forth.

Figure 2:
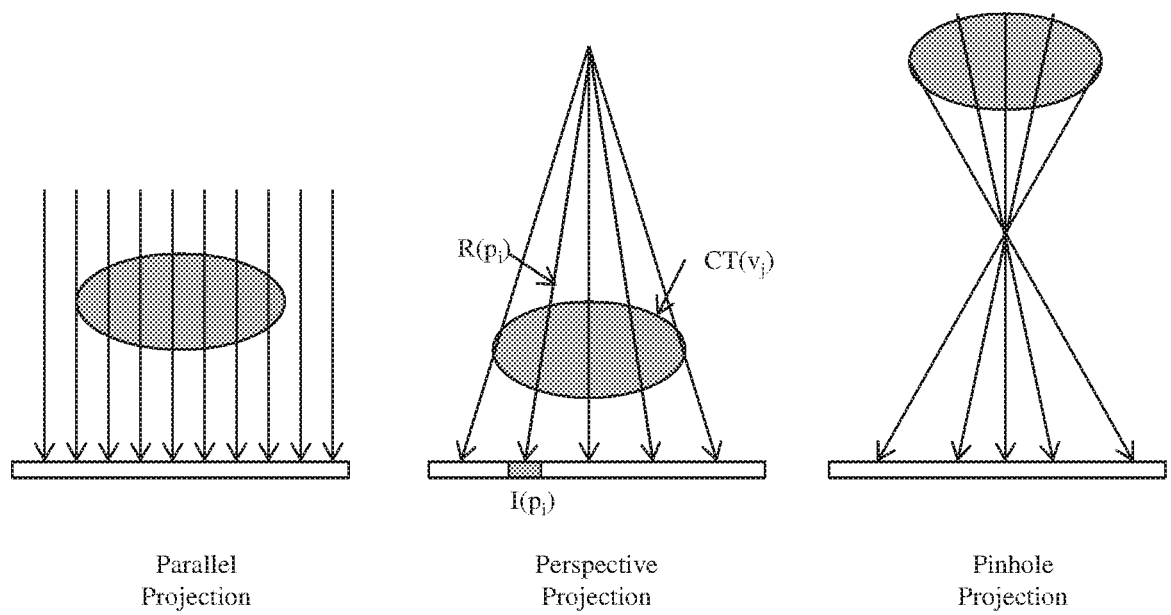
FIG. 2 illustrates examples of different types of projection geometries that may be used in the systems of FIGS. 1 and 3, in accordance with some embodiments.

In an embodiment, the system 100 may be used as an image guidance system to assist in patient or treatment tool alignment during treatment. For example, the computing device 102 receives a 3D image 110 of a patient and additional treatment information such as treatment alignment position (such as ISO-center position in radiation treatment) from the device 108. It then generates sub-volume projections 112, for one or multiple poses of the patient, employing the methods 400 or 800 described below. At treatment time, the computing device 102 receives a 2D image 118 of the patient, and uses the sub-volume projections 112 to generate one or more 2D images 120 which represent synthetic images of the patient at one or multiple poses, employing the method 500, 700, or 800 described below. The computing device 102 then employs an image processing or registration method and uses the 2D image 118 and the 2D images 120, together with other information such as geometry of the imaging device 116, to calculate a pose difference between the planned patient alignment position and current patient position. The computing device 102 may output the pose difference for patient position or treatment tool adjustment. Examples of projection types include, but not limited to, parallel projections (e.g., Gamma camera equipped with a parallel hole collimator), perspective projections (e.g., X-ray projection), and pinhole projections (e.g., Gamma camera equipped with a pinhole collimator) as shown in FIG. 2. If the 3D image is a CT image, and the imaging device 116 is an X-ray image system, the 2D images 120 may be DRRs.

The image registration method employed by the computing device 102 may be intensity based or other intra-modality methods such as those based on mutual information. The image registration method may operate iteratively: start with a hypothetical pose, create 2D images 120 (e.g. DRRs) for that pose, evaluate similarity between the 2D images and the intra-operative 2D image 118, search for the next potential pose, and generates new 2D images 120 for this new pose. The iteration goes on until some criterion is met. One exemplary criterion is that the difference between the current pose and the previous pose is small enough depending on the application (e.g., a rotational difference is less than 0.1 degree), which indicates a convergence in the iteration. Another exemplary criterion is that an objective function such as the gradient of the similarity function used by the image registration system 100 at the current pose is small enough for the application. The computing device 102 may implement other suitable criteria for determining the convergence. During the search, the 2D images 120 may be generated for multiple poses close to the current pose for numerical estimation of derivatives of the similarity function. For example, if the method employs a six-dimensional (6D) search (i.e., 3D translation and 3D rotation), additional 2D images 120 will be generated for six close poses just for a gradient estimation at one pose. Typically, the 2D images may be generated for hundreds of times during the image registration.

Figure 3:
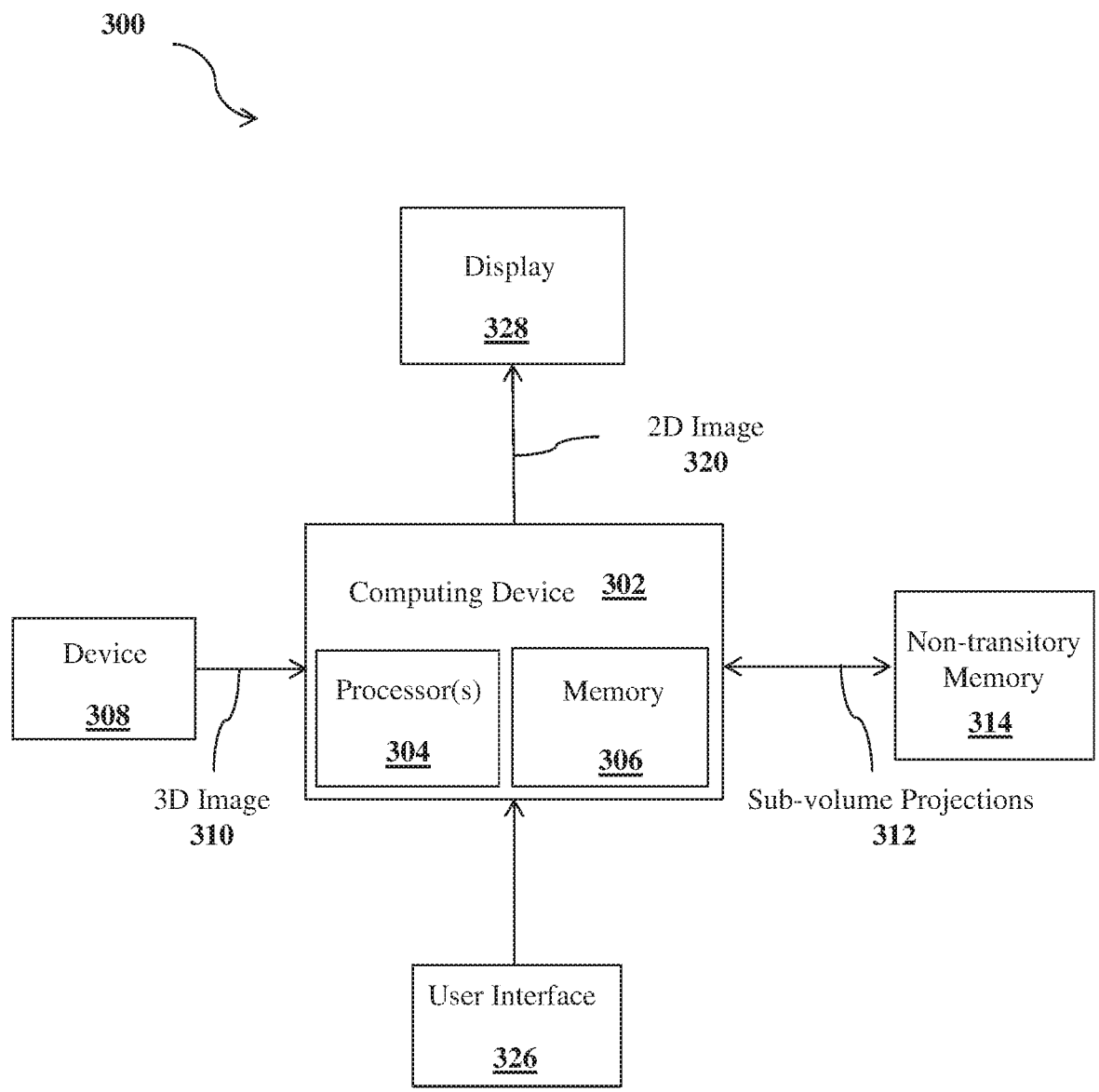
FIG. 3 is a schematic view of an image rendering system, constructed according to aspects of the present disclosure.

FIG. 3 is a schematic view of an embodiment of a system 300, constructed according to aspects of the present disclosure. In a particular embodiment, the system 300 may be used in image rendering. As shown in FIG. 3, the system 300 includes a computing device 302, a device 308 for providing a 3D image 310 to the computing device 302, and a non-transitory memory 314 for storing previously generated sub-volume projections 312. Many aspects of the computing device 302, the image providing device 308, and the non-transitory memory 314 are similar to those discussed with respect to the computing device 102, the image providing device 108, and the non-transitory memory 114. Some differences between them will be discussed below. The system 300 further includes a user interface 326 and a display 328. The computing device 302 includes one or more processors 304 and a memory 306, which may be substantially the same as the processor 104 and the memory 106 discussed above. The computing device 302 performs specific operations by the processor 304 and other components (not shown) by executing one or more sequences of instructions contained in the memory 306.

In an exemplary operation, the computing device 302 reads the 3D image 310 and pre-generates sub-volume projections 312 employing the methods 400 or 800 described below, and stores them in the non-transitory memory 314. At a later time, a user selects a pose usually in the form of a view angle through the user interface 326, for example, using a mouse, a pin-pad, or a touch pad. Then, the computing device 302 uses the sub-volume projections 312 to generate the 2D images 320 of the 3D image 310 at the user selected view angle employing the method 500, 700, or 800 described below, and sends it to the display device 328 for showing. The 3D image 310 can be any type of the 3D images described above with reference to the 3D image 110 (FIG. 1), or other type of 3D images such as microscopic images (such as confocal or wide-field microscope), transmission ultrasound image, or thermal images. In various embodiments, the projection geometry can be user defined or selected, can be parallel projections, perspective projections, or other suitable projection types.

FIGS. 4A, 5, 7, and 8 illustrate flow charts of computer-implemented methods 400, 500, 700, and 800, constructed in accordance with some embodiments of the present disclosure. Each of the methods 400, 500, 700, and 800 may be implemented, in whole or in part, by an image processing system such as the systems 100 and 300. Each of the methods 400, 500, 700, and 800 is an example of the provided subject matter, and is not intended to limit the present disclosure beyond what is explicitly recited in the claims. Additional operations can be provided before, during, and after each of the methods 400, 500, 700, and 800; and some operations described can be replaced, eliminated, or relocated for additional embodiments of the respective method. For the purposes of illustration, each of the methods 400, 500, 700, and 800 is described below in conjunction with FIGS. 1 and 3.

Figure 4A:
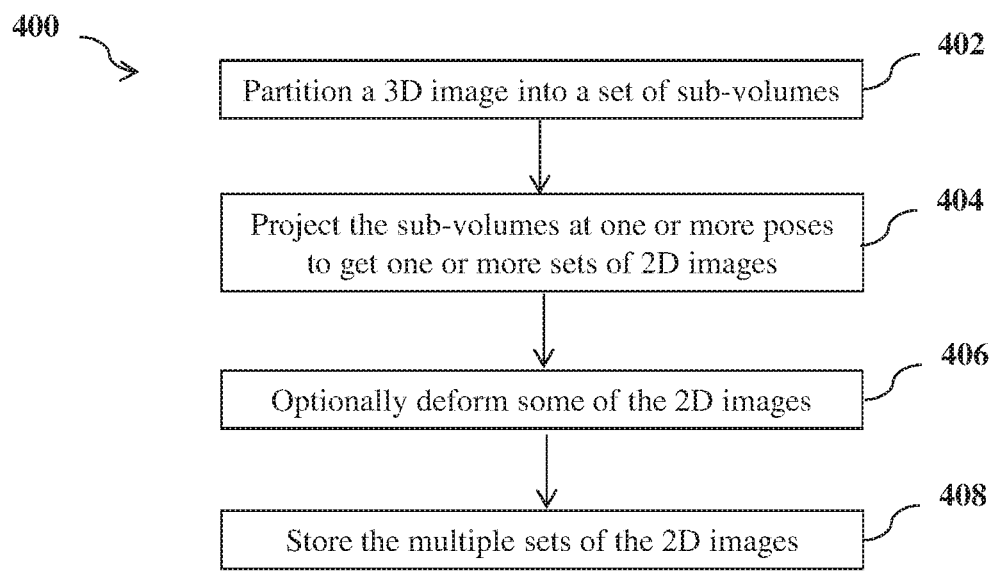
FIG. 4A illustrates a flow chart of computer-implemented methods for quickly generating 2D images from an existing 3D image, constructed in accordance with some embodiments of the present disclosure.

Referring to FIG. 4A, the method 400 includes an operation 402 for partitioning a 3D image into a set of sub-volumes, an operation 404 for projecting the sub-volumes at multiple poses to get multiple sets of 2D images, an operation 406 for optionally deforming some of the 2D images, and an operation 408 for storing the multiple sets of the 2D images which may have been optionally deformed. Details of each operation are further described below.

At operation 402, the method 400 (FIG. 4A) partitions a 3D image into a set of sub-volumes. In an embodiment, the set of sub-volumes are non-overlapping. The 3D image may be, for example, the 3D image 110 (FIG. 1) or the 3D image 310 (FIG. 3). In the present embodiment, the 3D image includes a set of value of positions (or points) represented as (x, y, z, v), wherein x, y, and z represent the coordinates of a position in a 3D space, and v is a value associated with that position. The 3D image can also be represented as a 3D matrix, v=I(i, j, k), where i, j, and k are the indices of an element v of the 3D matrix. Each element of the 3D matrix corresponds to a position (x, y, z) in the 3D space if a voxel size in the three dimensions is defined. In this way, the 3D image represents a volume in the 3D space. In the present embodiment, at least one of the sub-volumes is smaller than the total volume of the 3D image, but at one spatial point spans at least two times of the minimum dimensional unit along each of three axes (or indices) that define the 3D image. If the 3D image is represented in a matrix form, this means that the sub-volume has at least two elements at each of the indices i, j, and k. If the 3D image is represented as a set of value of positions, this means that there are at least two voxels along each of the dimensions x, y, and z in the sub-volume. For example, if the 3D image is a 3D CT image, the sub-volume is thicker than a single slice of the 3D image along the projection line. In an embodiment, the operation 402 partitions the 3D image along one of the three dimensions i, j, and k of the 3D matrix. For example, partitioning along the dimension "i" may be such that each sub-volume $V_s$ consists of N (N>1) slices, $V_1=\{I(i, j, k): 1\leq i\leq N\}$, $V_2=\{I(i, j, k): N+1\leq i\leq 2*N\}$, and so on. The number of slices in a sub-volume $V_s$ is also referred to as the thickness of the sub-volume $V_s$. In an embodiment, the number N is chosen to be 5 or more for data reduction purposes. The partition can be on the dimensions j or k as well. The sub-volumes $V_s$ can be of different thicknesses. In an embodiment, the operation 402 uses a partition boundary that intercepts with the direction of the projection rays.

At operation 404, the method 400 (FIG. 4A) projects the sub-volumes Vs at one or more poses to get one or more sets of 2D images. Each 2D image corresponds to a sub-volume and a pose, and 2D images in the same set correspond to the same pose. In a 2D image, each pixel may be expressed as (x, y, v), where (x, y) is a position on an imaging surface or an index to a matrix, and v is a value assigned for that position or index. The surface can be planar or curved in various embodiments. In an embodiment, the 2D images are represented in the form of matrix, I(i, j), where rows and columns of the matrix define a grid of pixels (or elements). In an embodiment, for each of the poses, the operation 404 calculates the projection (or image) of every sub-volume Vs using a projection geometry. Examples of projection geometry include, but not limited to, the ones shown in FIG. 2. In one example, a value of an element in a 2D image is a line integral of a projection ray hitting that element through the corresponding sub-volume. Accordingly, a 2D image, I(x,y), of a 3D dataset can be represented as:

$$I(x,y)=T(V(X,Y,Z)) \quad (1)$$

where V(X,Y,Z) is a 3D dataset, I(x,y) is a 2D image of the 3D dataset, T represents the projection process, x and y are coordinates or indices on the image surface, and X, Y, and Z are coordinates or indices in a 3D space. In an embodiment, 2D images in the same set take values at the same grid of pixel, i.e., at the same set of (x, y) coordinate values. In a further embodiment, the grid of pixels includes more than 100 pixels.

In X-ray imaging, photons (originated from a point or point-like source) propagate through a 3D object and generate a 2D image that is received by a detector. If a 3D dataset of the object is available as a CT scan, a simulated X-ray image, a.k.a., a digitally reconstructed radiograph (DRR), can be computed using the 3D CT scan and perspective projection geometry. As shown in FIG. 2, for a pixel $p_i$, the 2D image $I(p_i)$ can be represented as integral of voxel values along the ray $R(p_i)$ that hits that pixel:

$$I(p_i)=\Sigma_{v_j\in R(p_i)}CT(v_j) \quad (2)$$

where $CT(v_j)$ is the value of voxel $v_j$ that is on the path of $R(p_i)$. Note that the rays are defined by the corresponding projection geometry and there can only be one ray for each element of the projections in the present embodiment (scattering is neglected in this projection model).

The operation 404 may employ methods known in the art to create the projection, I(pi), given a sub-volume $V_s$ and the set of projection rays $R(p_i)$. For example, the operation 404 may use the ray casting method as described in D. B. Russakoff et al. "Fast calculation of digitally reconstructed radiographs using light fields." *Proc. SPIE Medical Imaging* 2003, pp. 684-695 (SPIE 2003). For another example, the operation 404 may use the splatting method as described in W. Birkfellner et al. "Fast DRR generation for 2D/3D registration." Duncan, J., Gerig, G., (eds.) MICCAI 2005, LNCS vol. 3750, pp. 960-967 (Springer Berlin Heidelberg, 2005).

Projection of a sub-volume Vs can be repeated for each of the poses selected. A pose is the spatial relationship of the 3D image and the projection geometry, including relative position and orientation, positions of the elements or pixels (usually determined by the position and orientation of the imager that obtains the ray values). In practice, it is common that the projection geometry, determined by the geometry of imaging system, does not change. If the imaging device such as the imaging device 116 of FIG. 1 is moving, but it moves together as a unit without relative motion, then the imaging geometry can still be considered unchanged. Then, the pose is represented as an object (e.g., a patient) pose relative to a reference coordinate system. Note that rotating or translating the imaging device all together is equivalent to rotating or translating the object in opposite directions with fixed projection geometry.

Figure 4B:
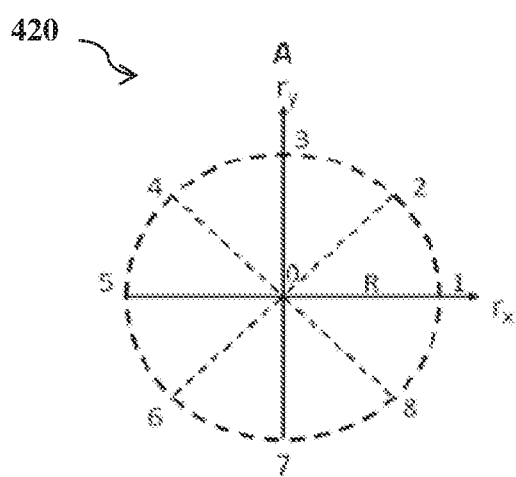
FIGS. 4B and 4C illustrate pose grids that may be implemented by the system of FIG. 1, in accordance with some embodiment.
Figure 4C:
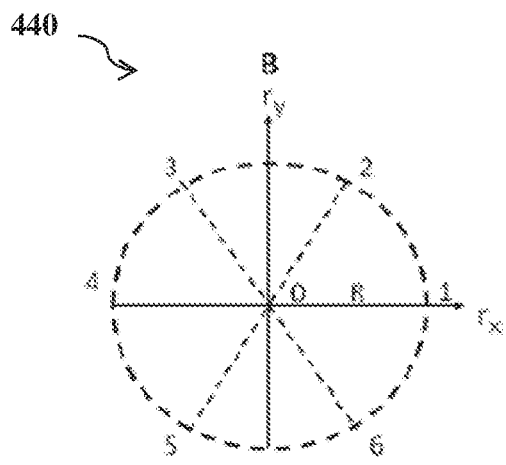

In an embodiment, the operation 404 selects the one or more poses from a pose grid. As used herein, a pose grid is a configuration of poses that the operation 404 projects the sub-volumes at. In various embodiments, the methods 400, 500, 700, and 800 are insensitive to rotations around the optical axis of the projection geometry. Therefore, a pose grid comprises poses with rotations around the other two in-plane axes. FIGS. 4B and 4C show two exemplary pose grids 420 and 440. The pose grid 420 has 9 poses, and the pose grid 440 has 7 poses. In each of the pose grids 420 and 440, the poses are evenly distributed on a circle in rotational space. In each of the FIGS. 4B and 4C, $r_x$ and $r_y$ are the rotation around in-plane axes (i.e., parallel to the projection plane) x and y respectively, and R is the radius of the circle. The R may be 1 degree, 2 degrees, 3 degrees, 5 degrees, or other suitable values, depending on the application.

At operation 406, the method 400 (FIG. 4A) optionally applies 2D deformation to some or all of the 2D images. As used herein, a 2D deformation is a point-wise deviation applied to a 2D array. In an embodiment of the method 400, for a 2D image with an i-th element being $(x_i, y_i, v_i)$, applying a 2D deformation $(\Delta x_i, \Delta y_i)$ for this element results in a deformed image with the i-th element being $(x_i+\Delta x_i, y_i+\Delta y_i, v_i)$. If the deformed image is stored in the same matrix form as the original image, the deformed image can be interpolated to the grid points defined by the matrix. In another embodiment, the method 400 applies a parameterized deformation, such as a linear centered deformation. The linear centered deformation can be written as $(\Delta x_i, \Delta y_i)= ((x_i-x_c)\times D, (y_i-y_c)\times D)$, where $(x_c, y_c)$ is the center of deformation, and D is a constant. Other examples of parameterized deformation include those using B-spline functions as described in Balci, Serdar K., et al. "Free-form B-spline deformation model for groupwise registration."*Medical image computing and computer-assisted intervention: MICCAI . . . International Conference on Medical Image Computing and Computer-Assisted Intervention*. (Vol. 10. No. WS. NIH Public Access, 2007).

At operation 408, the method 400 (FIG. 4A) stores the resultant 2D images (e.g., the sub-volume projections 112 and 312) in a transitory memory or a non-transitory memory (e.g., the non-transitory memory 114 and 314) with linkage to their corresponding poses and sub-volumes in such a way that each pixel or element of the 2D image can be linked to a point (e.g. a central point) in the sub-volume that is on the path of the projection ray for that element. For example, if a sub-volume includes a number of adjacent slices of a 3D CT image, the points linked to its corresponding 2D image can be all located on the center slice. In an embodiment, the 2D images are stored in the form of a matrix, I(i, j), where i, j are indices of the rows and columns of the matrix.

Figure 5:
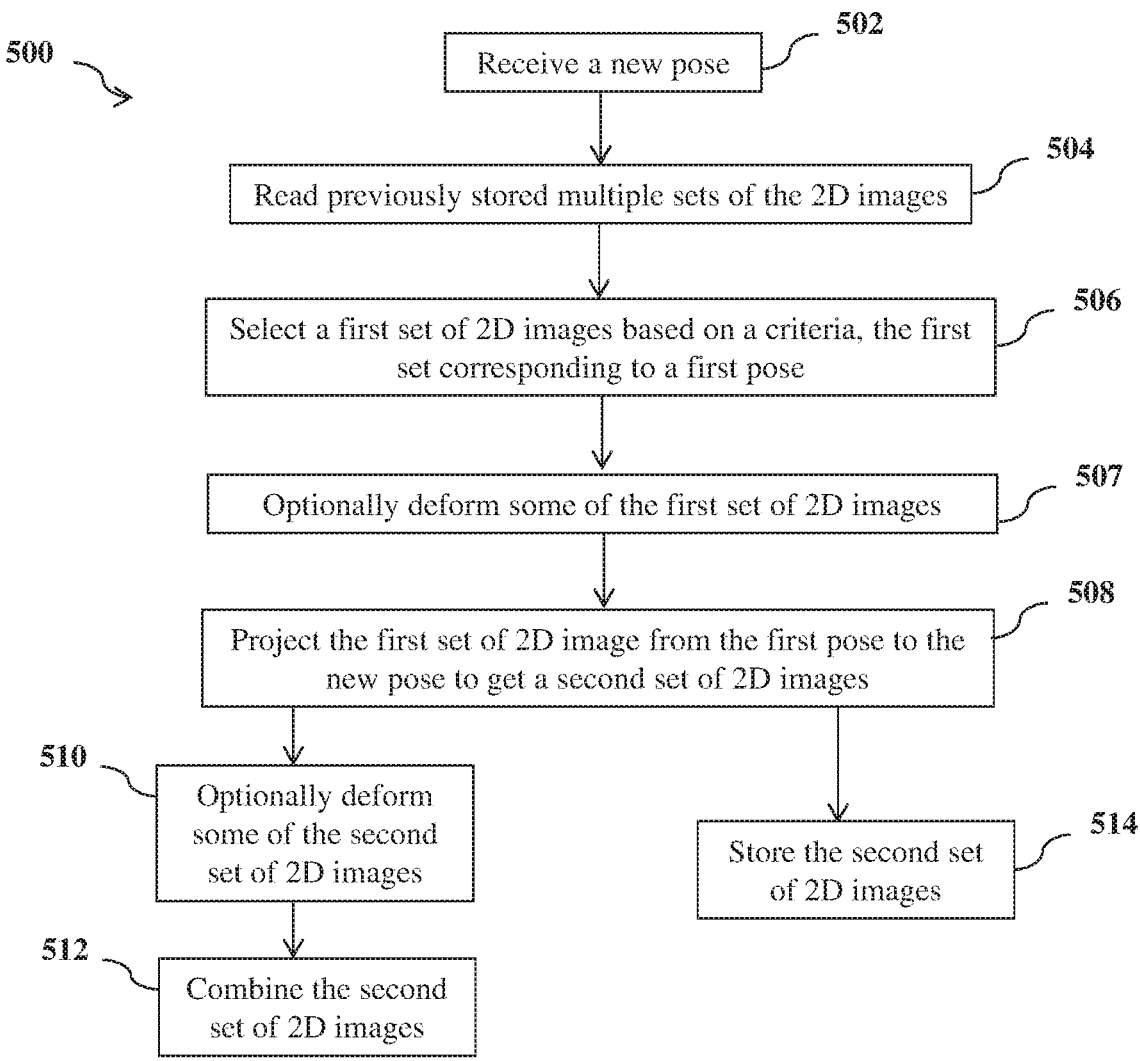
FIG. 5 illustrates a flow chart of computer-implemented methods for quickly generating 2D images from an existing 3D image, constructed in accordance with some embodiments of the present disclosure.

Referring to FIG. 5, the method 500 includes an operation 502 for receiving a new pose, an operation 504 for reading previously stored one or more sets of the 2D images, and an operation 506 for selecting one of the sets of the 2D images. The selected set of the 2D images corresponds to a first pose. The method 500 further includes an operation 507 for optionally deforming the selected set of 2D images, and an operation 508 for projecting the selected set of 2D images (which may have been deformed in the operation 507) from the first pose to the new pose to get a second set of 2D images. The method 500 further includes optionally deforming some of the second set of 2D images in operation 510 and then combining the second set of 2D images in operation 512. The method 500 further includes storing the second set of 2D images into a non-transitory memory such as the memory 114 and 314 in operation 514. Details of each operation are further described below.

At operation 502, the method 500 (FIG. 5) receives a new pose and determines if it is the same as any existing pose linked to the stored sub-volume projections 112 or 312. The new pose may be selected by a user through the user interface 326 (FIG. 3) or generated by the computing device 102 executing instructions of an image processing method such as an image registration method.

At operation 504, the method 500 (FIG. 5) reads one or more sets of 2D images associated with one or more poses. For example, the computing device 102 (or 302) reads the sub-volume projections 112 (or 312) from the non-transitory memory 114 (or 314).

If there are multiple poses associated with the sets of 2D images read in the operation 504, at operation 506, the method 500 (FIG. 5) compares the new pose received in operation 502 with the poses of the sets of 2D images read in operation 504, and selects one pose as the first pose, and the corresponding set of 2D images as the first set of 2D images.

In an embodiment, the criterion to select the first pose is to select the pose having the smallest pose difference with respect to the new pose. The pose difference between two poses is six dimensional, involving both translation ($\Delta x$, $\Delta y$, $\Delta z$) and rotation ($\Delta rx$, $\Delta ry$, $\Delta rz$) in 3D space. In one example of fixed imaging geometry where the pose is represented as the object pose, the operation 506 may select the pose having the smallest rotational difference $|\Delta r|=(\Delta rx^2+\Delta ry^2+\Delta rz^2)^{1/2}$ with respect to the new pose. In another embodiment, the operation 506 selects a pose that results in the smallest projection difference. In an example, the operation 506 first picks a plurality of points, $R_0$, $R_1$, ... $R_m$, in the volume and calculates their projections to the image surface under the multiple poses. For example, the projections of the points are $Q_0(n)$, ... $Q_m(n)$ under a pose P(n), and $Q_0(k)$, ... $Q_m(k)$ under another pose P(k). Using the point $R_0$ as the base, the difference of the point $R_i$ under the poses P(n) and P(k) can be defined as:

$$Di(n) = \sqrt{(Qi(n)_x - Q0(n)_x - (Qi(k)_x - Q0(k)_x))^2 + (Qi(n)_y - Q0(n)_y - (Qi(k)_y - Q0(k)_y))^2} \quad (3)$$

where $Q_i(n)_x$ and $Q_i(n)_y$ are the (x, y) coordinates of $Q_i(n)$ in the image plane. In this example, the operation 506 selects the pose P(t) that results in the smallest total difference of all the points $R_0$, $R_1$, ... $R_m$. In other words:

$$P(t) = \min_n(\Sigma_{i=1}^m Di(n)) \quad (4)$$

or $$P(t) = \min_n(\sqrt{\Sigma_{i=1}^m Di(n)^2}) \quad (5)$$

At operation 507, the method 500 (FIG. 5) optionally deforms some of the first set of 2D images. This is similar to what is done in the operation 406 of the method 400. The operation 507 may further store the deformed first set of 2D images in a memory (a transitory or non-transitory memory) for later use.

Figure 6A:
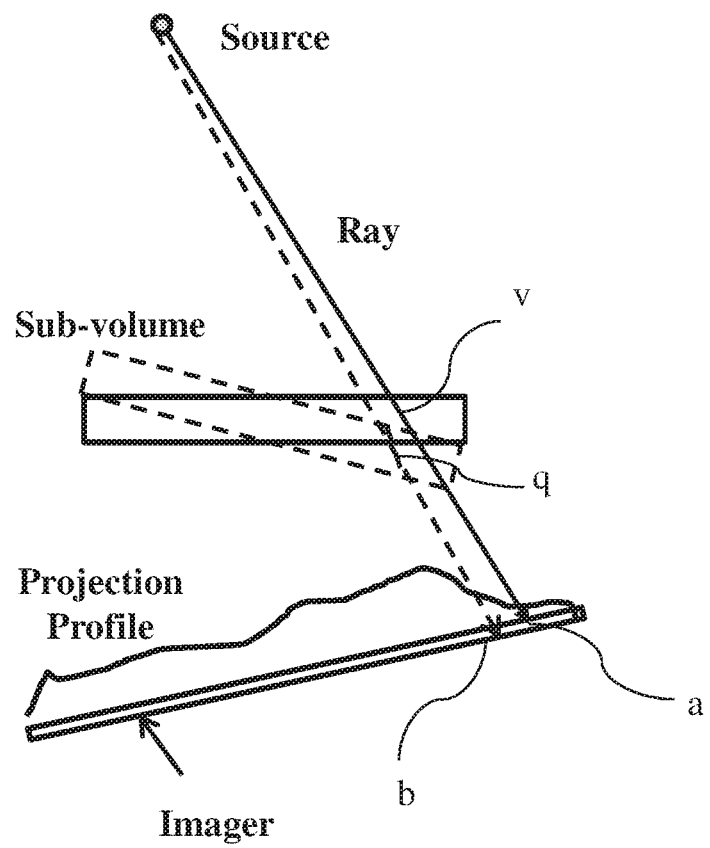
FIGS. 6A and 6B illustrate projections of a sub-volume from a first pose to a second pose, which may be implemented by the system of FIG. 1, in accordance with some embodiment.

At operation 508, the method 500 (FIG. 5) projects the first set of 2D images from the first pose to the new pose, thereby generating a second set of 2D images for the new pose. This operation is also referred to as re-projection and the 2D images in the second set are also referred to as re-projected 2D images. An exemplary re-projection is illustrated in FIG. 6A. Referring to FIG. 6A, for an image in the first set of 2D images, a pixel or element "a" represented as ($x_a$, $y_a$, $v_a$) corresponds to a 3D point "v" in the corresponding sub-volume. In the new pose, the imaging geometry is different, and the same point "v" is moved to a new position "q" and projected to a point "b" on the imager, represented as ($x_b$, $y_b$, $v_a$). Note that the same value $v_a$ is assigned to the new position ($x_b$, $y_b$). The operation 508 carries out the above re-projection for each element of every image in the first set of 2D images, thereby obtaining the second set of the 2D images for the new pose.

Figure 6B:
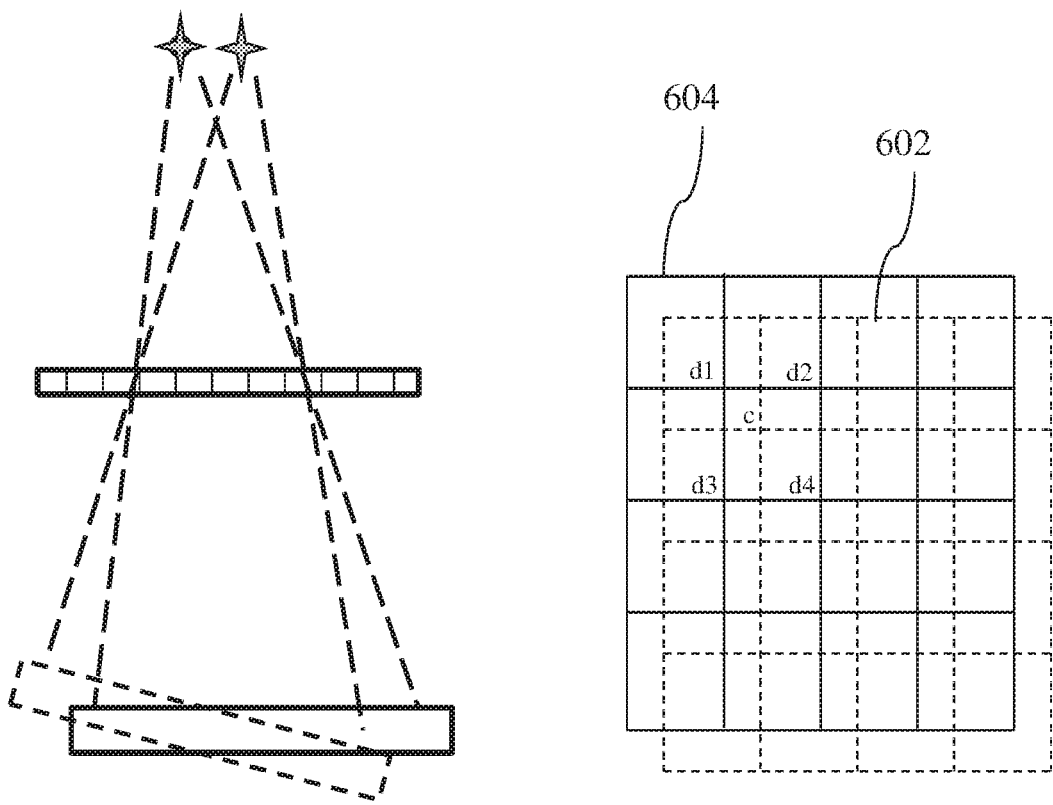

In an embodiment, the 2D images are represented in the form of matrix where rows and columns of the matrix define a grid of pixels (or elements), and then use the same grid of the pixels in all 2D images in the first and second sets. This is particularly useful for the operation 512 discussed below where re-projected 2D images are combined. However, pixels of a re-projected 2D image may or may not be on the matrix grid in the new pose. This is illustrated in FIG. 6B where the dashed lines represent a grid 602 for the new pose, while the solid lines represent a grid 604 of the re-projected 2D image. Particularly, the pixels d1, d2, d3, d4 of the re-projected 2D image are not on the grid points in the new pose. In the present embodiment, the operation 508 re-samples these points to the matrix grid 602 in the new pose using a method such as the nearest-neighbor method or the interpolation method. In the nearest-neighbor method, a value v at the grid point ($x_m$, $y_m$) in the new pose is determined as follows: first, identify a re-projected pixel ($x_i$, $y_i$) that is closest to the grid point ($x_m$, $y_m$), for example, based on Euclidean distance between the two; and then use the value of the re-projected pixel ($x_i$, $y_i$) as the value v for the grid point ($x_m$, $y_m$). In the example shown in FIG. 6B, the nearest-neighbor method results in assigning the value at the pixel d1 to the pixel c. In the interpolation method, neighboring re-projected pixels of ($x_m$, $y_m$) are identified in the first image (after projection), and the value for ($x_m$, $y_m$) is the interpolation of values of these neighboring re-projected points. In the example shown in FIG. 6B, the interpolation method results in assigning the interpolation of values of d1, d2, d3, and d4 to the pixel c.

At operation 510, the method 500 (FIG. 5) optionally applies deformation to some or all of the second set of 2D images. The deformation may be performed similar to the operation 406 of the method 400. The ability to apply deformation to a set of 2D images (e.g., operation 406 in method 400, and operations 507 and 510 in the method 500) provides additional flexibility, particularly to the system 100 shown in FIG. 1. For example, human body may undergo some form of deformation due to a number of factors, such as respiratory motion and filling of bladder. Therefore it is desirable to perform deformable registration between the 2D images 118 and the 2D images 120. Usually, only 2D images (either 118 or 120) may be deformed during registration, representing only a 2D deformation. Applying deformation to the second set of 2D images in the operation 510 enables 3D deformation because different deformation can be applied to different images in the second set of 2D images. As the images in the second set of 2D images correspond to different sub-volumes, this creates a 3D deformation effect. This is an advantage of the provided subject matter.

At operation 512, the method 500 (FIG. 5) combines the second set of 2D images to form a single 2D image at the new pose. Some of the 2D images may have been deformed in the operation 510. The second set of 2D images may be the 2D images 120 in FIG. 1, or the 2D images 320 in FIG. 3. In an embodiment, the operation 512 combines the second set of 2D images using an element-by-element or pixel-by-pixel operation. For example, it may combine elements with the same (x, y) coordinate or (i, j) index in each of the second set of 2D images. Methods for combining the elements include, but are not limited to, summation, weighted summation, and non-linear summation of the corresponding element values. In the summation method, if the k-th image in the second set of 2D images is $I_k(i, j)$, then the resultant 2D image, $I_2(i, j)$, can be given as a summation, $$I_2(i,j) = \Sigma_k I_k(i,j) \quad (6)$$

In the weighted summation method, the resultant 2D image, $I_2(i, j)$, can be given as $$I_2(i,j) = \Sigma_k I_k(i,j) \times A_k \quad (7)$$

where $A_k$ are weight parameters. In an example of the non-linear summation, the resultant 2D image, $I_2(i, j)$, can be given as:

$$I_2(i,j) = \Sigma_k I_k(i,j)^E \times A_k \quad (8)$$

where E is a finite exponential parameter that is not equal to 0 and $A_k$ are weight parameters. In an embodiment, if the second set of 2D images is not sampled to the same pose grid, they can be re-sampled to the same pose grid using the interpolation or nearest-neighbor methods discussed above.

At operation 514, the method 500 (FIG. 5) stores the second set of 2D images for future processing. They may be stored in a transitory or non-transitory memory, such as the non-transitory memory 114 (FIG. 1) or 314 (FIG. 3).

Figure 7:
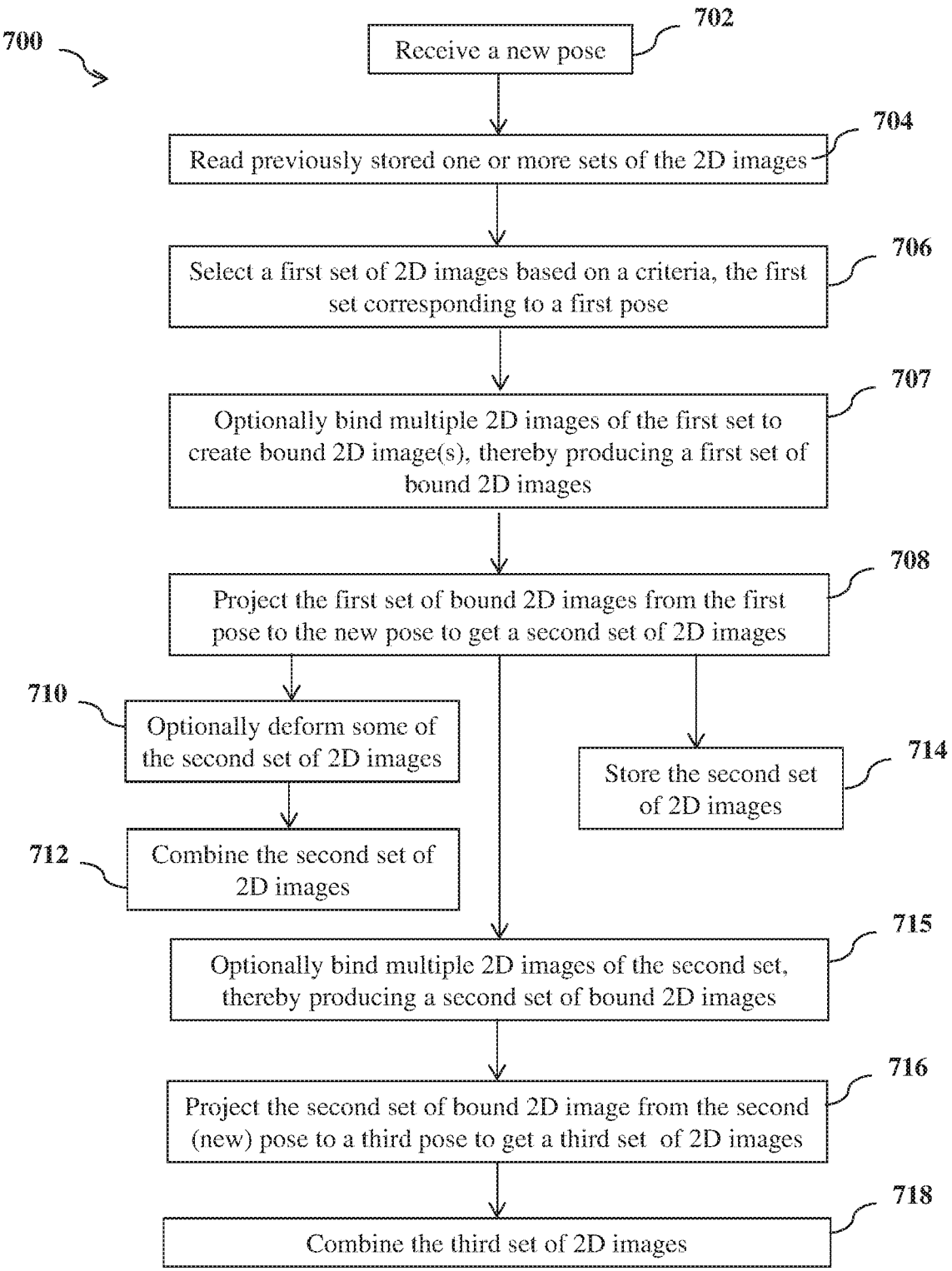
FIGS. 7 and 8 illustrate flow charts of computer-implemented methods for quickly generating 2D images from an existing 3D image, constructed in accordance with some embodiments of the present disclosure.

Referring to FIG. 7, the method 700 includes operations 702, 704, 706, 707, 708, 710, 712, 714, 715, 716, and 718. The operations 702, 704, 706, 710, 712, and 714 are similar to the operations 502, 504, 506, 510, 512, and 514. For the purposes of simplicity, the detailed description of these operations is not repeated. The following discussion focuses on aspects of the operations 707, 708, 715, 716, and 718.

At operation 707, the method 700 (FIG. 7) binds multiple 2D images in the first set of 2D images into one image, which is referred to as a bound 2D image. The operation 707 repeats the binding of the images in the first set of 2D images, thereby producing a first set of bound 2D images. In an embodiment, all images in the first set of 2D images are used in the operation 707 only once. In other words, the first set of bound 2D images does not overlap with each other. For example, the operation 707 may bind every N images of the first set of 2D images into a bound 2D image where the N images correspond to adjacent sub-volumes in the 3D image. This way, a bound 2D image corresponds to a sub-volume that is thicker than a sub-volume corresponding to a single 2D image in the first set of 2D images. In an embodiment, if the 2D images in the first set take values at the same grid of pixels, then the operation 707 binds them pixel-to-pixel or element-to-element. Otherwise, the operation 707 re-samples the 2D images onto the same grid of pixels before binding them. In embodiments, the operation 707 may bind the 2D images using methods similar to those described in the operation 512 above, including summation, linear summation, and non-linear summation. Furthermore, the operation 707 may bind different numbers of 2D images to obtain the first set of bound 2D images. For example, the operation 707 may bind $N_1$ adjacent 2D images to form a first bound 2D image, bind $N_2$ adjacent 2D images to form a second bound 2D image, . . . and bind $N_m$ adjacent 2D images to form an m-th bound 2D image, and so on. The numbers $N_1$, $N_2$ . . . $N_m$ may be the same or different integers. In various embodiments, at least one of the numbers $N_1$, $N_2$ . . . $N_m$ is greater than 1 and the numbers $N_1$, $N_2$ . . . $N_m$ may change each time the operation 707 is executed. As a result, the first set of bound 2D images includes at least one 2D image that encompasses more than one 2D image of the first set of 2D images, and may include some 2D image that is the same as the corresponding 2D image of the first set of 2D images (i.e., not bound with another 2D image). Furthermore, since the first set of 2D images corresponds to the first pose, the first set of bound 2D images also corresponds to the first pose. Each bound 2D image in the first set of bound 2D images is associated with a sub-volume in such a way that each element or pixel of the bound 2D image is associated with a point in that sub-volume as a result of projection (e.g., operation 404 of FIG. 4A) and binding (operation 707 of FIG. 7). In an embodiment, the operation 707 updates the linkage of the bound 2D images to the associated poses and sub-volumes. In the following discussion, the first set of bound 2D images may also be referred to as the first set of 2D images with the understanding that some of the images in the first set of 2D images may have been bound together by the operation 707.

The binding technique employed in the operation 707 provides flexibility to achieve additional time reduction in generating 2D images at a new pose. After multiple images in the first set of 2D images are bound in the operation 707, there are a reduced number of 2D images to be projected in operation 708. This binding technique can be particularly useful when the new pose is close to the first pose selected at the operation 706.

At operation 708, the method 700 (FIG. 7) projects the first set of bound 2D images from the first pose to the second (new) pose. This is similar to the operation 508 (FIG. 5).

At operation 715, the method 700 (FIG. 7) binds multiple 2D images in the second set of 2D images into a bound 2D image, thereby producing a second set of bound 2D images. At operation 716, the method 700 (FIG. 7) projects the second set of bound 2D images from the second pose (which is the new pose received at the operation 702) to a third pose that is different from the first and second poses. The operations 715 and 716 are similar to the operations 707 and 708. The operations 715 and 716 are particularly useful in calculating derivatives during image registration such as performed in the system 100 (FIG. 1). Image registration frequently employs the calculation of image derivatives. For example, at a given pose, it usually generates 2D images (DRRs) at that pose, plus 2D images at poses with slight deviations along each of the dimensions of freedom. For an example with six degree of freedom (3 in rotation and 3 in translation), it would generate at least 6 poses with small deviation from the given pose. These 6 poses are referred to as derivative poses, and the third pose in the operation 716 is a derivative pose in the present embodiment. To generate 2D images for these derivative poses, the method 700 may apply binding (operation 715) to the second set of 2D images after the operation 708, resulting in a reduced number of images in the second set of 2D images. This reduces the number of images to be projected from the new pose to the third pose in the operation 716, and therefore reducing the time required to generate 2D images for the derivative poses.

Figure 8:
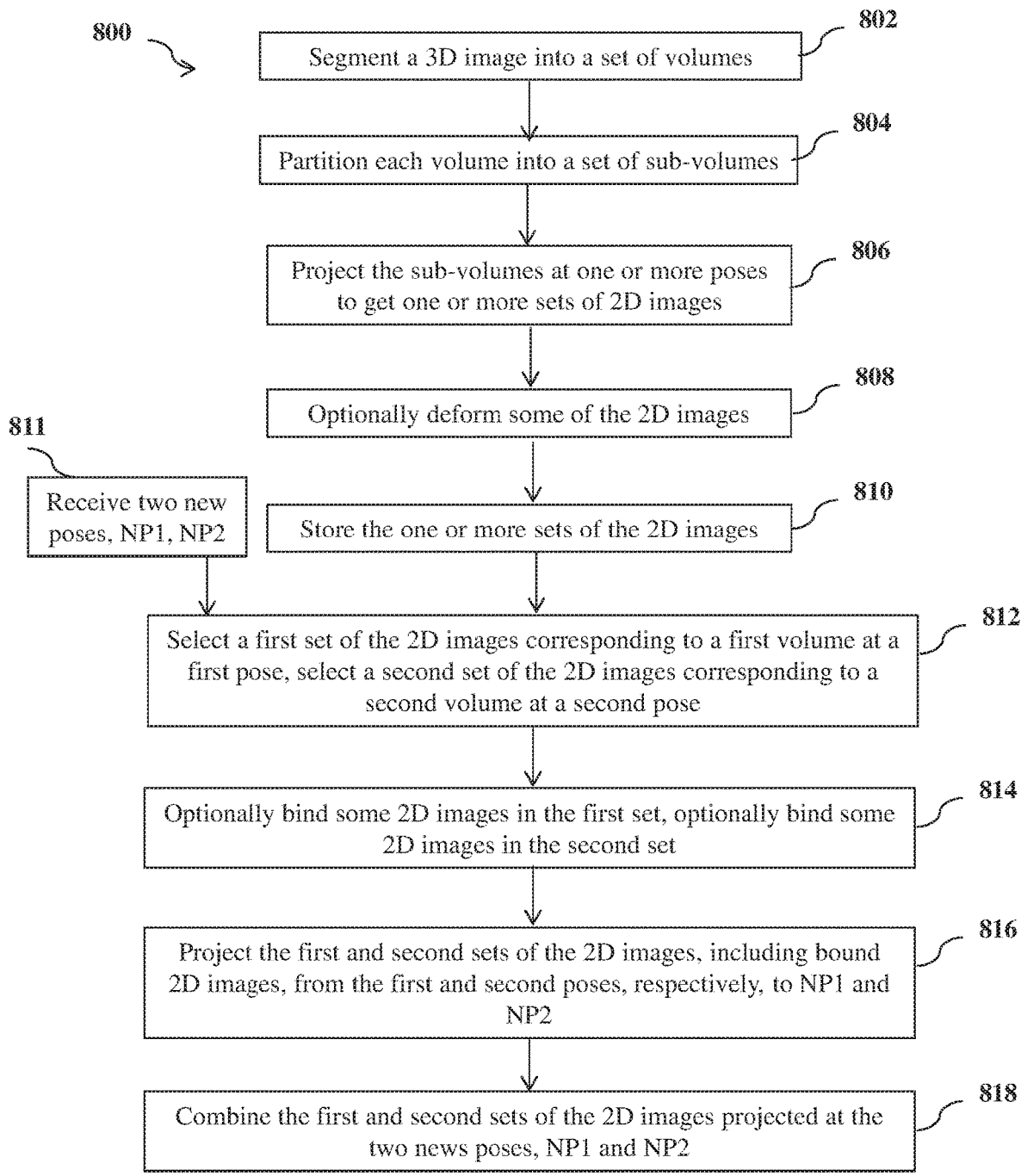

Referring to FIG. 8, the method 800 includes operations 802, 804, 806, 808, 810, 811, 812, 814, 816, and 818. The operations 804, 806, 808, and 810 are substantially the same as the operations 402, 404, 406, and 408. For the purposes of simplicity, these operations are briefly discussed below. The following discussion focuses on aspects of the operations 802, 811, 812, 814, 816, and 818. The method 800 is further described below in conjunction with FIG. 9.

At operation 802, the method 800 (FIG. 8) segments a 3D image into a set of volumes, and these volumes may or may not expand to the same space as that represented by the 3D image. Further, these volumes may overlap with each other in space. In an embodiment, the segmentation may be based on different tissues in the object. For example, if the 3D image is a CT image, the operation 802 may segment the 3D image based on voxel or element values into a high density volume, $I_H$, and a low density volume, $I_L$, where $I_H$ represents bones and other high density parts such as implanted metal instrument or blood vessel injected with high density contrast agent, and $I_L$ represents soft tissue, air, etc. For example, the operation 802 may compare each element of the 3D image with a threshold T such that:

$$I_H(i,j,k)=I(i,j,k), \text{ if } I(i,j,k) \geq T; \text{ and } 0 \text{ otherwise} \quad (9)$$

$$I_L(i,j,k)=I(i,j,k), \text{ if } I(i,j,k) < T; \text{ and } 0 \text{ otherwise} \quad (10)$$

For another example, the operation 802 may compare each element of the 3D image with a threshold T such that:

$$I_H(i,j,k)=I(i,j,k)-T, \text{ if } I(i,j,k) \geq T; \text{ and } 0 \text{ otherwise} \quad (11)$$

$$I_L(i,j,k)=I(i,j,k), \text{ if } I(i,j,k) < T; \text{ and } T \text{ otherwise} \quad (12)$$

In another embodiment, the 3D image may be segmented into a tumor volume and a non-tumor volume, based on a tumor contour drawn by an auto-segmentation tool, or drawn slice-by-slice on the 3D image by a human operator. In yet another embodiment, the 3D image may be segmented into one or more volumes of interest and another volume representing the rest of the 3D image. Contours of the volumes of interest can be drawn by a segmentation tool or by a human operator. These volumes of interest may represent tumors or tissues that are likely to move during treatment and have substantial effects on the 2D images as well as the processing of the 2D images. With reference to the example shown in FIG. 9, the operation 802 segment the 3D image, Z, of an object into volumes V and W.

At operation 804, the method 800 (FIG. 8) partitions each of the volumes into a set of sub-volumes, similar to what is done in the operation 402 of the method 400. The partitions for any two volumes may be the same or different. For example, for the $I_H$ and $I_L$ volumes described above, the operation 804 may partition $I_H$ into a set of smaller sub-volumes than the sub-volumes partitioned from $I_L$. For another example, the operation 804 may partition a volume of higher interest into a set of smaller sub-volumes than another volume of lower interest. This results in higher accuracy in the further processing of the 2D images associated with the volume of higher interest. With reference to the example shown in FIG. 9, the operation 804 partitions the volume V into sub-volumes V1, V2, and V3, and the volume W into sub-volumes W1 and W2.

At operation 806, the method 800 (FIG. 8) projects the sub-volumes of each of the volumes at one or more poses to generate one or more sets of 2D images. This operation is similar to what the operation 404 does in the method 400. However, the poses for different volumes may be the same, partly different, or completely different. With reference to the example shown in FIG. 9, the operation 806 projects the sub-volumes V1, V2, V3 at pose 1 to get a set of 2D images V11, V21, and V31; and projects the sub-volumes W1 and W2 at pose 1 to get another set of 2D images W11 and W21. Similarly, the operation 806 projects the sub-volumes V1, V2, V3, W1, and W2 to other poses 2 and 3.

At operation 808, the method 800 (FIG. 8) optionally applies deformation to some of the 2D images generated from the operation 806, similar to what the operation 406 does in the method 400.

At operation 810, the method 800 (FIG. 8) stores the one or more set of 2D images, for example, in the non-transitory memory 114 or 314. The 2D images are organized, and can be identified, by their corresponding volume, pose, and sub-volume.

At operation 811, the method 800 (FIG. 8) receives two new poses NP1 and NP2. The new poses NP1 and NP2 may be the same or different. They may be provided by an image registration or processing system, such as the system 100. For example, if a volume of interest is a volume inside a patient's lung, that volume may move significantly during treatment, while the rest of the patient's body lies relatively still. Therefore, it is desirable to evaluate the similarity between the 2D image 118 and the 2D images 120 by placing a generated volume of interest inside the image of the lung at a pose different from the rest of the body to simulate the relative movement. To further this example, the new poses NP1 and NP2 represent the poses of the volume of interest (the moving part) and the rest of the body (the still part).

The operation 811 can be further illustrated with another example. If X-ray based images are used as the 2D images 118 in the system 100, at one iteration (may not be the first one) during image registration, the system 100 may choose to always regenerate 2D images 120 for the high density volume $I_H$, but only regenerate 2D images 120 for the low density volume $I_L$ if the pose difference is larger than a threshold. Otherwise, it uses a stored previously-generated 2D image for the low density volume. This is because high density tissues are more eminent than the low density tissues on an X-ray image.

At operation 812, the method 800 (FIG. 8) selects a first pose according to the new pose NP1, for a first volume, and a second pose according to the new pose NP2 for a second volume, similar to what the operation 506 does in the method 500. Since NP1 and NP2 may be the same or different, the first pose for the first volume and the second pose for the second volume may be the same or different as well. With reference to the example shown in FIG. 9, the operation 812 selects pose 1 for the volume V and pose 3 for the volume W.

At operation 814, the method 800 (FIG. 8) optionally binds multiple 2D images in the same set of 2D images (corresponding to the same volume and pose) into one 2D image, similar to what the operation 707 does in the method 700. The sets of 2D images for the first and second volumes may be bound in the same way or differently. For example, the operation 814 may bind every $N_H$ 2D images in the first set of 2D images for the volume $I_H$, and bind every $N_L$ 2D images in the second set of 2D images for the volume $I_L$, where $N_H$ and NL may be the same or different. Furthermore, the operation 814 may bind multiple 2D images in the first set only, in the second set only, in both the first and second sets, or in neither of the first and second sets. With reference to the example shown in FIG. 9, the operation 814 may bind the projections V11 and V21 into a bound 2D image (V11+V21), leave the projection V31 standalone, and bind the projections W13 and W23 into another bound 2D image (W13+W23), as illustrated by the dashed ellipses.

At operation 816, the method 800 (FIG. 8) projects the first set of 2D images to the new pose NP1, and projects the second set of 2D images to the new pose NP2. Each of the first and second sets of 2D images may include bound 2D image(s). These are two separate operations and are similar to what the operations 508 and 708 do in the methods 500 and 700. With reference to the example shown in FIG. 9, the operation 816 projects the 2D images (V11+V21) and V31 to the new pose NP1 (pose x), thereby obtaining new 2D image (V11+V21)x and V3x, where (V11+V21) represents the bound 2D image of V11 and V21. Similarly, the operation 816 projects the bound 2D image (W13+W23) to the new pose NP2 (pose y), thereby obtaining a new 2D images (W13+W23)y.

At operation 818, the method 800 (FIG. 8) first combines the two sets of projections individually to get 2D images of the two volumes at the new poses respectively, such as G1 and G2 in FIG. 9. This is similar to what is done in the operation 512 in the method 500. The combined projections G1 and G2 may both be stored for future use. The method 800 then combines G1 and G2 together as a single 2D image G, such as shown in FIG. 9. Similar to the operation 512 in the method 500, the combination of G1 and G2 may be performed pixel-by-pixel or element-by-element. In an embodiment, if G1 and G2 are not sampled to the same pose grid, they can be re-sampled to the same pose grid using the interpolation or nearest-neighbor methods discussed above.

Although not intended to be limiting, one or more embodiments of the present disclosure provide many benefits for generating a 2D image from previously generated 3D dataset. Embodiments of the present disclosure achieve significant time reduction while maintaining DRR quality. Further, the provided subject matter provides an efficient and flexible way to re-use projections of sub-volumes, where quality and speed can be controlled through the thickness of the sub-volumes during partition and binding operations.

The foregoing has outlined features of several embodiments. Persons having ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method, comprising:
   providing a set of 2D images of an object, wherein the set of 2D images is obtained from a three-dimensional (3D) image of the object placed at a first pose;
   projecting the set of 2D images from the first pose to a second pose different from the first pose, thereby obtaining a set of re-projected 2D images; and
   combining the set of re-projected 2D images into a single 2D image.

2. The method of claim 1, wherein the projecting of the set of 2D images includes sampling the set of re-projected 2D images to a grid corresponding to the second pose.

3. The method of claim 1, before the combining of the set of re-projected 2D images, further comprising:
   deforming at least one of the set of re-projected 2D images.

4. The method of claim 1, before the projecting of the set of 2D images, further comprising:
   binding multiple 2D images of the set of 2D images into a bound 2D image, wherein the multiple 2D images correspond to adjacent sub-volumes of the 3D image, wherein the projecting of the set of 2D images includes projecting the bound 2D image from the first pose to the second pose.

5. The method of claim 1, further comprising:
   binding multiple images of the set of re-projected 2D images, thereby obtaining another 2D image; and
   projecting the another 2D image from the second pose to a third pose different from the second pose.

6. The method of claim 1, further comprising:
   projecting the set of re-projected 2D images from the second pose to a third pose different from the second pose, thereby obtaining another set of re-projected 2D images; and
   combining the another set of re-projected 2D images.

7. The method of claim 1, further comprising:
   storing the set of re-projected 2D images into a computer-readable non-transitory memory.

8. The method of claim 1, further comprising:
   partitioning the 3D image of the object into a set of sub-volumes; and
   projecting the set of sub-volumes at the first pose, thereby obtaining the set of 2D images.

9. The method of claim 8, further comprising:
   deforming some of the set of 2D images before the projecting of the set of 2D images from the first pose to the second pose.

10. A method, comprising:
    partitioning a three-dimensional (3D) image of an object into a set of sub-volumes, wherein at least one of the set of sub-volumes is smaller than a total volume of the 3D image but at one spatial point spans at least two times of a minimum dimensional unit along each of three axes that define the 3D image;
    projecting the set of sub-volumes into an image surface with the object being at a first pose, thereby generating a set of two-dimensional (2D) images; and
    storing the set of 2D images in a non-transitory memory.

11. The method of claim 10, further comprising:
    deforming at least one of the set of 2D images.

12. The method of claim 11, further comprising:
    projecting the set of 2D images from the first pose to a second pose, thereby obtaining a second set of 2D images; and
    combining the second set of 2D images into a single 2D image.

13. The method of claim 12, before the projecting of the set of 2D images, further comprising:
    binding multiple 2D images of the set of 2D images into a bound 2D image, wherein the multiple 2D images correspond to adjacent sub-volumes of the 3D image, wherein the projecting of the set of 2D images includes projecting the bound 2D image.

14. The method of claim 12, further comprising:
    binding multiple 2D images of the second set of 2D images into a bound 2D image.

15. A method, comprising:
segmenting a three-dimensional (3D) image of an object into a set of volumes that include first and second volumes;
partitioning the first volume and the second volume into first sub-volumes and second sub-volumes, respectively;
projecting the first sub-volumes into an image surface with the object being at a first pose, thereby generating a first set of two-dimensional (2D) images;
projecting the second sub-volumes into the image surface with the object being at a second pose, thereby generating a second set of 2D images; and
storing the first and second sets of 2D images in a computer-readable non-transitory memory.

16. The method of claim 15, further comprising:
deforming some of the first and second sets of 2D images.

17. The method of claim 15, further comprising at least one of two following operations:
projecting the first set of 2D images from the first pose to a third pose different from the first pose, thereby obtaining a third set of 2D images; and
projecting the second set of 2D images from the second pose to a fourth pose different from the second pose, thereby obtaining a fourth set of 2D images.

18. The method of claim 17, further comprising:
combining the third and fourth sets of 2D images into a single 2D image.

19. The method of claim 17, before the projecting of the first set of 2D images, further comprising:
binding multiple 2D images of the first set into a bound 2D image.

20. The method of claim 19, before the projecting of the second set of 2D images, further comprising:
binding multiple 2D images of the second set into another bound 2D image.

* * * * *